US008539656B2

(12) United States Patent
Katou et al.

(10) Patent No.: US 8,539,656 B2
(45) Date of Patent: Sep. 24, 2013

(54) FASTENING TOOL

(75) Inventors: Keigo Katou, Toyota (JP); Masataka Mizuno, Kasugai (JP); Yoshio Hirooka, Inuyama (JP)

(73) Assignee: Aoyama Seisakusho Co., Ltd., Nagoya-Shi (JP)

( * ) Notice: Subject to any disclaimer, the term of this patent is extended or adjusted under 35 U.S.C. 154(b) by 0 days.

(21) Appl. No.: 13/235,711

(22) Filed: Sep. 19, 2011

(65) Prior Publication Data

US 2012/0011969 A1 Jan. 19, 2012

Related U.S. Application Data

(62) Division of application No. 11/955,743, filed on Dec. 13, 2007.

(30) Foreign Application Priority Data

Dec. 20, 2006 (JP) ................................. 2006-342077

(51) Int. Cl.
*F16B 5/02* (2006.01)

(52) U.S. Cl.
USPC ................ 29/243.529; 29/525.02; 29/525.01; 29/525.11; 29/452

(58) Field of Classification Search
USPC ............. 29/525.02, 525.01, 525.11, 243.529, 29/452
See application file for complete search history.

(56) References Cited

U.S. PATENT DOCUMENTS 3,015,975 A 1/1962 Biach
3,679,173 A 7/1972 Sherrick et al.
4,347,728 A 9/1982 Smith
5,604,968 A * 2/1997 Fulbright et al. .......... 29/407.05
6,125,526 A 10/2000 Wierzchon

FOREIGN PATENT DOCUMENTS

DE 199 40 976 A1 3/2000
FR 2 071 195 A 9/1971
FR 2 367 574 A 5/1978
FR 2 580 742 A 10/1986
GB 2 223 075 A 3/1990
JP 57-114336 A1 7/1982
JP 63-707887 U1 5/1988
JP 55-008314 B2 3/1990
JP 2672190 B2 7/1997
JP 10-015752 A1 1/1998
WO 82/00851 A1 3/1982
WO 90/14904 A1 12/1990

* cited by examiner

*Primary Examiner* — David Bryant
*Assistant Examiner* — Christopher Besler
(74) *Attorney, Agent, or Firm* — Burr & Brown

(57) ABSTRACT

The invention provides a fastening method and a fastening tool which can stably fasten a nut to a bolt securely and with a small dispersion at a desired axial force. A fastened member is fastened by inserting a bolt to the fastened member, thereafter temporarily fastening a nut and the bolt, pulling a leading end of a shaft portion of the bolt in an axial direction of the bolt, rotating the nut so as to screw into the bolt while elastically deforming the bolt so as to generate an axial force, and thereafter canceling the pulling of the bolt.

2 Claims, 19 Drawing Sheets

FASTENING TOOL

CROSS REFERENCE TO RELATED APPLICATION

This application is a division of U.S. application Ser. No. 11/955,743, filed Dec. 13, 2007, and claims the benefit under 35 USC §119(a)-(d) of Japanese Application No. 2006-342077 filed Dec. 20, 2006, the entireties of which are incorporated herein by reference.

FIELD OF THE INVENTION

The present invention relates to a fastening method of generating an axial force in a bolt so as to fasten a nut, and a fastening tool used for this method.

BACKGROUND OF THE INVENTION

Conventionally, as a fastening method, there has been a fastening method using a bolt and a nut. The fastening method using the bolt and the nut is structured such that an axial force (an elastic energy) stored in a shaft of the bolt acts as a force for pulling in an axial direction of the bolt on thread surfaces of the bolt and the nut, thereby preventing the bolt and the nut from being loosened on the basis of a friction force generated on the thread faces so as to fasten a fastened member. Accordingly, it is necessary to securely store the axial force in the shaft of the bolt, however, about 90% of a fastening torque is lost due to a friction between a seat surface of the nut and the fastened member and a friction of the thread surface at a time of screwing and fastening the nut to the bolt, and only about 10% of the fastening torque can store the axial force in the shaft of the bolt. As mentioned above, since it is impossible to sufficiently store the axial force in the shaft of the bolt, there has been a problem that the bolt and the nut are loosened due to a repeated load and a vibration applied to the fastened member.

Further, there are risks that the friction force between the seat surface of the nut and the fastened member and the friction force of the threaded portions are scattered, and the seat surface of the nut and the fastened member, and the threaded portions are gnawed or seized, whereby the axial force stored in the shaft of the bolt is not stable, and the bolt and the nut are loosened. Accordingly, in the case of fastening a high strength portion, there is employed a countermeasure of applying a friction coefficient stabilizing agent to a thread ridge of the bolt, thereby stabilizing the axial force of the bolt. Therefore, there is a problem that a cost is increased.

Accordingly, in the case that a detachment of the fastening is not allowed, there is used a non-disassemble swage method, as shown in U.S. Pat. No. 4,347,728. The non-dissemble swage method is a method of inserting a pin 51 having a parallel groove 51*a* formed on a surface of a shaft to a fastened member 52, thereafter setting a collar 53 from a leading end 51*b* of the pin, caulking the collar 53 from both sides while pulling the leading end 51*b* of the pin by a special tool (not shown) and fastening the fastened member, as shown in FIG. 18. In accordance with this method, it is possible to securely apply the axial force to the pin 51. However, in accordance with this non-assemble swage fastening method, since it is necessary to break the pin 51 and the collar 53 by the special tool at a time of detaching, there is a problem that the pin 51 and the collar 53 can not be reused, as well as a detaching work becomes complicated.

Accordingly, there has been proposed a swage fastening method as shown in Japanese Patent No. 2672190. The swage fastening method is a method of inserting a Hacks pin 61 (trade mark) in which a spiral lock groove 61*a* is formed as shown in FIG. 19 in place of the parallel groove 51*a* to a fastened member 62, setting a collar 63 from a leading end 61*b* of the pin, and caulking the collar 63 from both sides while pulling the leading end 61*b* of the pin by a special tool (not shown) so as to fasten the fastened member.

In the swage fastening method using the Hacks pin 61 (trade mark), it is possible to detach the collar 63 from the Hacks pin 61 (trade mark) by gripping the collar 63 so as to rotate without breaking the Hacks pin (trade mark) and the collar 63 at a time of detaching. However, since the collar 63 is caulked so as to be fastened, there has been a problem that the once detached collar 63 can not be reused.

Further, in the fastening methods mentioned above, since the collars 53 and 63 are plastically deformed so as to be caulked, it is assumed to use a soft material. In order to correspond to a high axial force, there has been a problem that it is necessary to set a height of the collars 53 and 63 high. Further, in the axial force fastening method, since the collars 53 and 63 are caulked, a surface treated layer such as a plating or the like applied to the surfaces of the collars 53 and 63 is scratched, and there has been a problem that a rust proofing countermeasure is necessary.

SUMMARY OF THE INVENTION

The present invention is finished by aiming to provide a fastening method and a fastening tool which solves the problems as mentioned above, securely and stably generates an axial force, prevents a bolt and a nut from being loosened due to a repeated load or vibration, does not require to apply a friction coefficient stabilizing agent to a thread ridge of the bolt, can be reused without any complicated detaching work, does not require to set a height of the nut high, and does not require any rust proofing countermeasure.

In order to solve the problems mentioned above, in accordance with the present invention, there is provided a fastening method of fastening a fastened member by a bolt and a nut, wherein the fastened member is fastened by inserting the bolt to the fastened member, thereafter temporarily fastening the nut and the bolt, pulling a shaft portion of the bolt in an axial direction of the bolt, rotating the nut so as to screw into the bolt while generating an axial force in the shaft portion of the bolt, and thereafter canceling the pulling of the bolt.

Alternatively, there is provided a fastening method of fastening a first fastened member in which a threaded hole is formed and a second fastened member in which a clearance hole is formed, wherein the first fastened member and the second fastened member are fastened by: screwing a nut into a stud bolt; integrating the stud bolt and the nut by a torque transmitting means by which the stud bolt and the nut do not rotate with each other at a predetermined low torque or less; pulling a leading end of the stud bolt in an axial direction of the stud bolt on a side into which the nut is screwed in, thereby the stud bolt is elastically deformed and an axial force is generated, while rotating and screwing the nut into the stud bolt; and finally canceling the pulling of the stud bolt.

In this case, it is preferable to have a state in which a gap is generated between a seat surface of the nut and the fastened member opposing to the seat surface, at a time of pulling the leading end of the shaft portion of the bolt in the axial direction of the bolt and rotating the nut so as to screw into the bolt.

In this case, in order to realize the invention mentioned above, there is provided a fastening tool comprising:

a tubular fastening member rotating a nut;

a spindle member stored in an inner portion of the fastening member and pulling a shaft portion of a bolt or a leading end of a stud bolt in an axial direction; and a pressing member pressing a fastened member on the basis of a reaction force applied to the spindle member and provided in an outer portion of the fastening member.

Further, it is preferable that an inner member is provided within the spindle member, the inner member being structures such that, if a leading end thereof is brought into contact with the leading end of the bolt or the leading end of the stud bolt, the rotation of the spindle member is stopped.

Further, it is preferable that an inner member is provided within the spindle member, the inner member being structured such that a leading end thereof engages with an engagement concave portion provided at the leading end of the bolt, slides in an axial direction, and rotates.

Further, it is preferable that the structure is made such as to stop the rotation of the spindle member if the leading end of the spindle member is screwed into a predetermined position from the leading end position of the inner member.

Further, it is preferable that an inner portion of the spindle member is provided with a fixing member in which a leading end thereof is engaged with an engagement concave portion provided in a leading end of the bolt so as to be slid in an axial direction and be prevented from rotating.

Alternatively, it is preferable that an inner portion of the spindle member is provided with a fixing member which is slid in an axial direction and has a leading end pressing the leading end of the bolt.

Further, it is preferable that the structure is made such as to stop the rotation of the spindle member if the leading end of the spindle member is screwed into a predetermined position from the leading end position of the fixing member.

Since the structure is made such as to pull the shaft portion of the bolt or the stud bolt in the axial direction of the bolt, generate the axial force in the stud bolt and screw the nut thereinto, it is possible to reduce the friction force between the threaded portion of the bolt and the threaded portion of the nut, and it is possible to securely and stably generate the axial force. Accordingly, it is possible to prevent the bolt and the nut from being loosened by the repeated load and vibration. Further, it is not necessary to coat the friction coefficient stabilizing agent to the thread ridge of the bolt for preventing the slack of the nut, and it is possible to make it unnecessary to set the height of the nut high. Further, since the surface treatment layer applied to the surface of the nut is not scratched at a time of fastening the nut, it is possible to make the rust proofing countermeasure unnecessary. Further, it is possible to provide the reusable fastening method and fastening tool without making the detaching work complicated. Further, it is possible to securely apply a desired axial force to the bolt and the stud bolt so as to fasten while monitoring the desired axial force by a load cell.

Further, since the structure is made such as to fasten the fastened member by canceling the pulling of the leading end of the bolt after screwing the nut into the bolt, the friction force is generated between the threaded portion of the bolt and the threaded portion of the nut on the basis of the axial force stored in the shaft portion of the bolt in the nut after being fastened, and the load pushing down in the axial direction is applied to the nut. Therefore the friction force is generated in the seat surface of the nut and the fastened member, and there can be provided the fastening method in which the nut is hard to be loosened.

In this case, on the assumption that there is provided a state in which the gap is generated between the seat surface of the nut and the fastened member opposing to the seat surface, at a time of pulling the leading end of the bolt or the stud bolt in the axial direction of the bolt, and rotating the nut so as to screw into the bolt or the stud bolt, the friction force is not generated between the seat surface of the nut and the fastened member opposing to the seat surface. Accordingly, it is possible to fasten while securely applying the axial force to the bolt or the stud bolt.

Further, in the case that the inner portion of the spindle member is provided with the inner member structured such that the rotation of the spindle member is stopped if the leading end thereof is brought into contact with the leading end of the bolt or the leading end of the stud bolt, the rotation of the spindle member is stopped if the leading end of the spindle member is screwed to the predetermined position from the leading end position of the inner member. Therefore, it is possible to prevent the spindle member from being brought into contact with the nut.

Further, in the case that the inner portion of the spindle member is provided with the inner member structured such that the leading end thereof is engaged with the engagement concave portion provided in the leading end of the bolt, is slid in the axial direction and is rotated, it is possible to temporarily fasten the bolt and the nut simply only by setting the fastening tool onto the nut, engaging the leading end of the inner member with the engagement concave portion, and rotating the inner member.

Further, in the case that the structure is made such as to stop the rotation of the spindle member if the leading end of the spindle member is screwed to the predetermined position from the leading end position of the inner member, it is possible to prevent the spindle member from being brought into contact with the nut.

Alternatively, in the case that the inner portion of the spindle member is provided with the fixing member in which the leading end thereof is engaged with the engagement concave portion provided in the leading end of the bolt, slides in the axial direction and does not rotate, the rotation of the bolt is blocked by inserting the leading end of the fixing member to the engagement concave portion of the bolt so as to engage. Accordingly, it is possible to prevent the nut and the bolt from rotating together.

Alternatively, in the case that the inner portion of the spindle member is provided with the fixing member which slides in the axial direction and has the leading end pressing the leading end of the bolt, it is possible to block the rotation of the bolt by pressing the leading end of the shaft portion of the bolt by the leading end of the fixing member at a time of screwing the threaded hole of the spindle member into the leading end of the bolt, and it is possible to prevent an idle rotation of the bolt.

Further, in the case that the structure is made such as to stop the rotation of the spindle member if the leading end of the spindle member is screwed to the predetermined position from the leading end position of the fixing member, it is possible to prevent the spindle member from being brought into contact with the nut.

DETAILED DESCRIPTION OF THE INVENTION

First Embodiment

A description will be given below of a preferable embodiment (a first embodiment) of the present invention with reference to the accompanying drawings.

An engagement concave portion 21*f* depressed in as a hexagonal shape or the like is provided in a leading end of a shaft portion 21*c* of a bolt 21 used in the present invention. In this case, a nut 22 in accordance with the embodiment is constituted by a hexagonal nut. However, the nut 22 is not limited to the hexagonal nut, but may be constituted by any nut such as a square nut, a dodecagonal nut, a torque nut.

Figure 1:
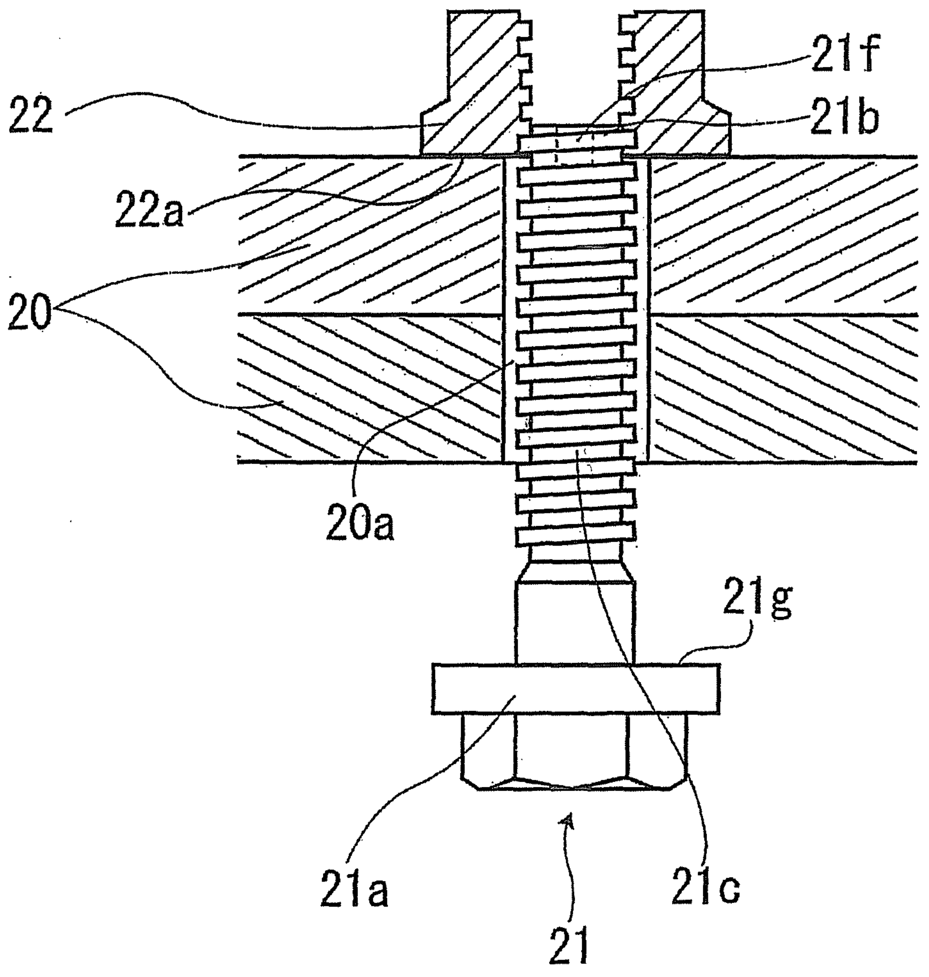
FIG. 1 is an explanatory view showing a first embodiment.

The bolt 21 is passed through a hole 20*a* of a fastened member 20, and the nut 22 is lightly fastened to a leading end 21*b* of the bolt 21 (a state in FIG. 1).

Figure 2:
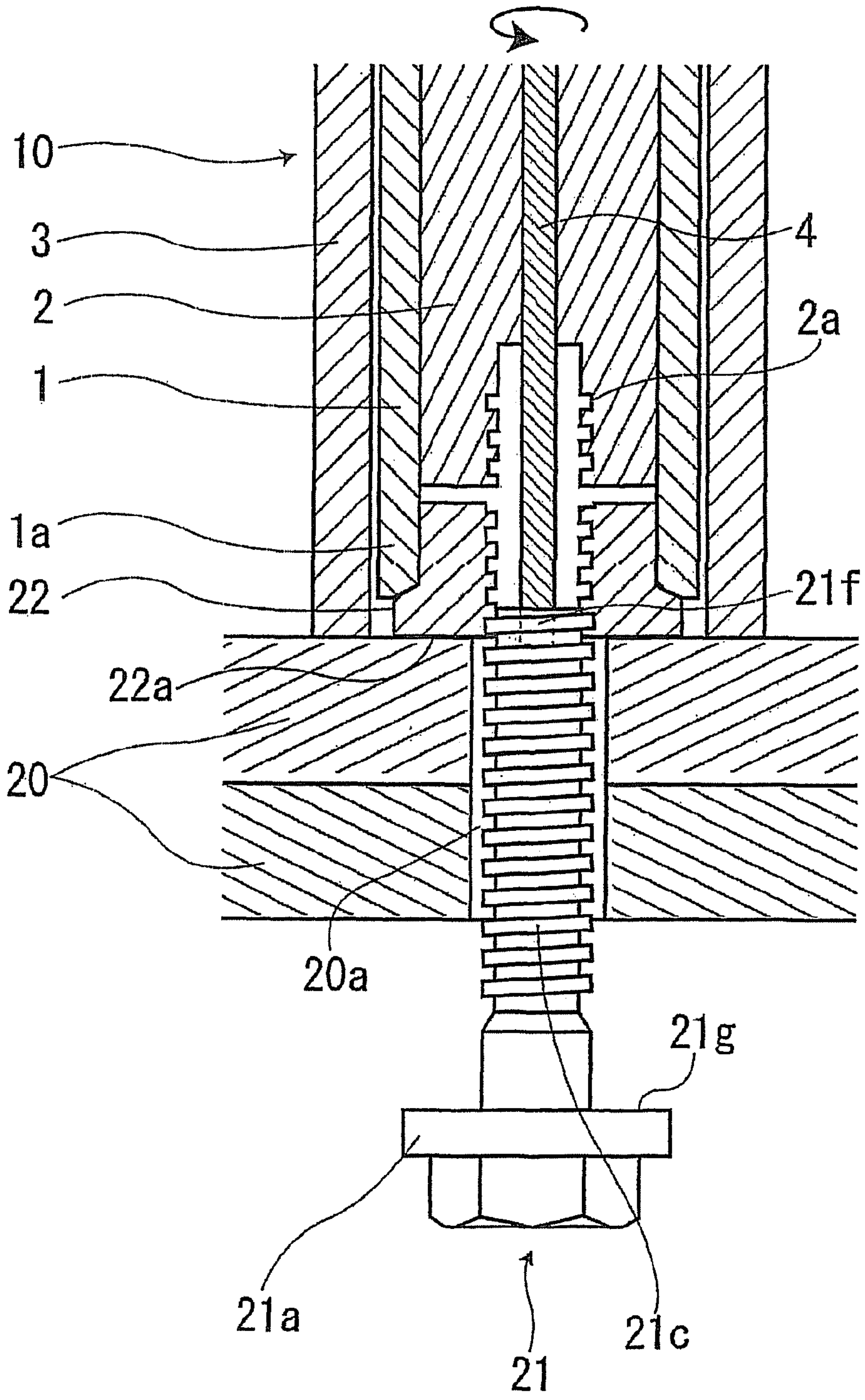
FIG. 2 is an explanatory view showing the first embodiment.

A fastening tool 10 used in the present invention is mainly constituted by a tubular fastening member 1, a spindle member 2 stored in an inner portion of the fastening member 1, an inner member 4 stored in an inner portion of the spindle member 2, and a pressing member 3 provided in an outer portion of the fastening member 1, as shown in FIG. 2. A leading end portion 1*a* of the fastening member 1 is structured such as to be engaged with the nut 22.

Figure 3:
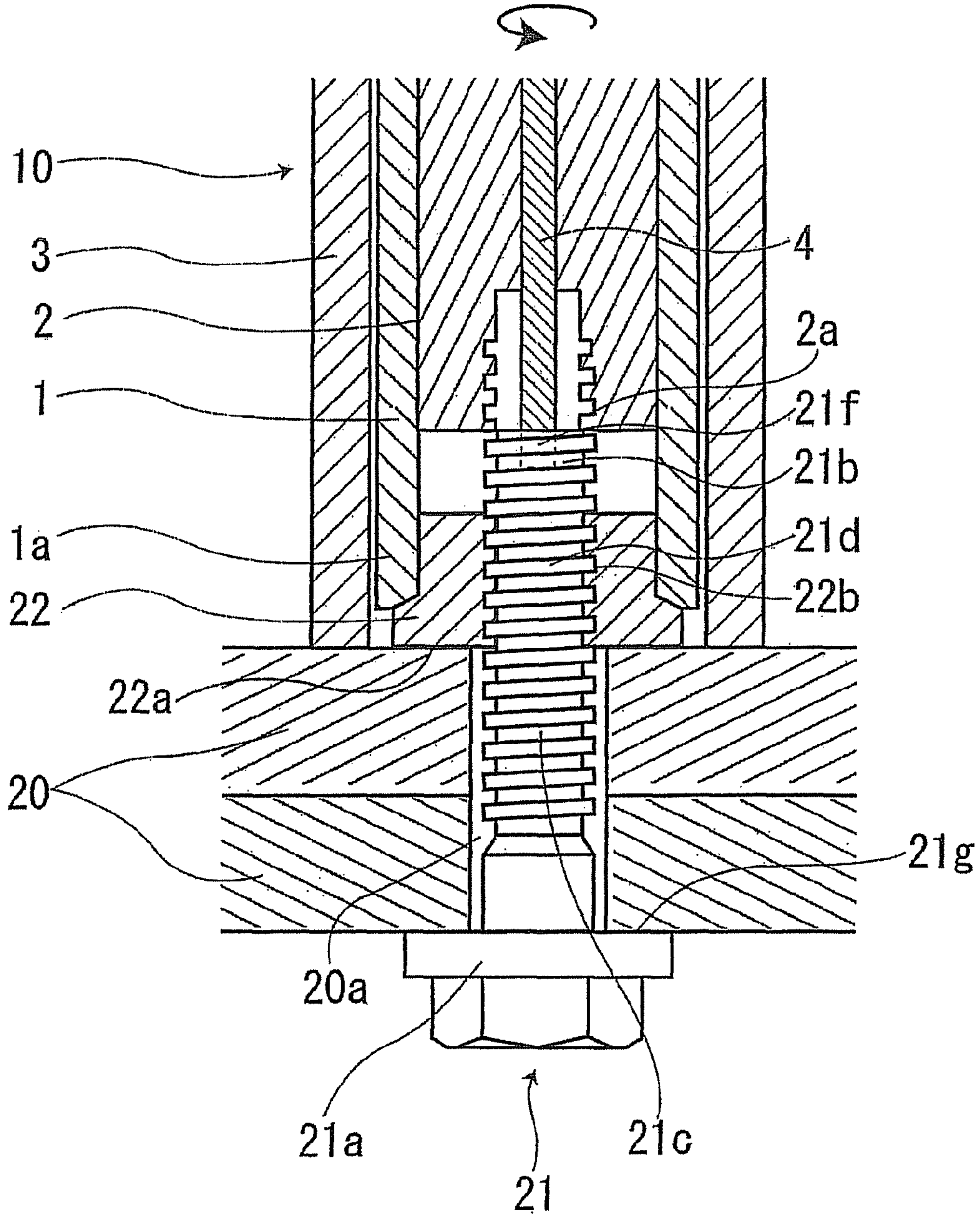
FIG. 3 is an explanatory view showing the first embodiment.

The fastening member 1 is engaged with the nut 22, the leading end of the inner member 4 is engaged with the engagement concave portion 21*f* of the bolt 21, and the fastening tool 10 is set (a state in FIG. 2). The bolt 21 and the nut 22 are temporarily fastened by rotating the inner member 4 so as to rotate the bolt 21 until a seat surface 21*g* of the bolt 21 comes into contact with the fastened member 20 (a state in FIG. 3). At this time, since the inner member 4 is rotated while fixing the fastening member 1, the nut 22 does not rotate together with the bolt 21.

Figure 4:
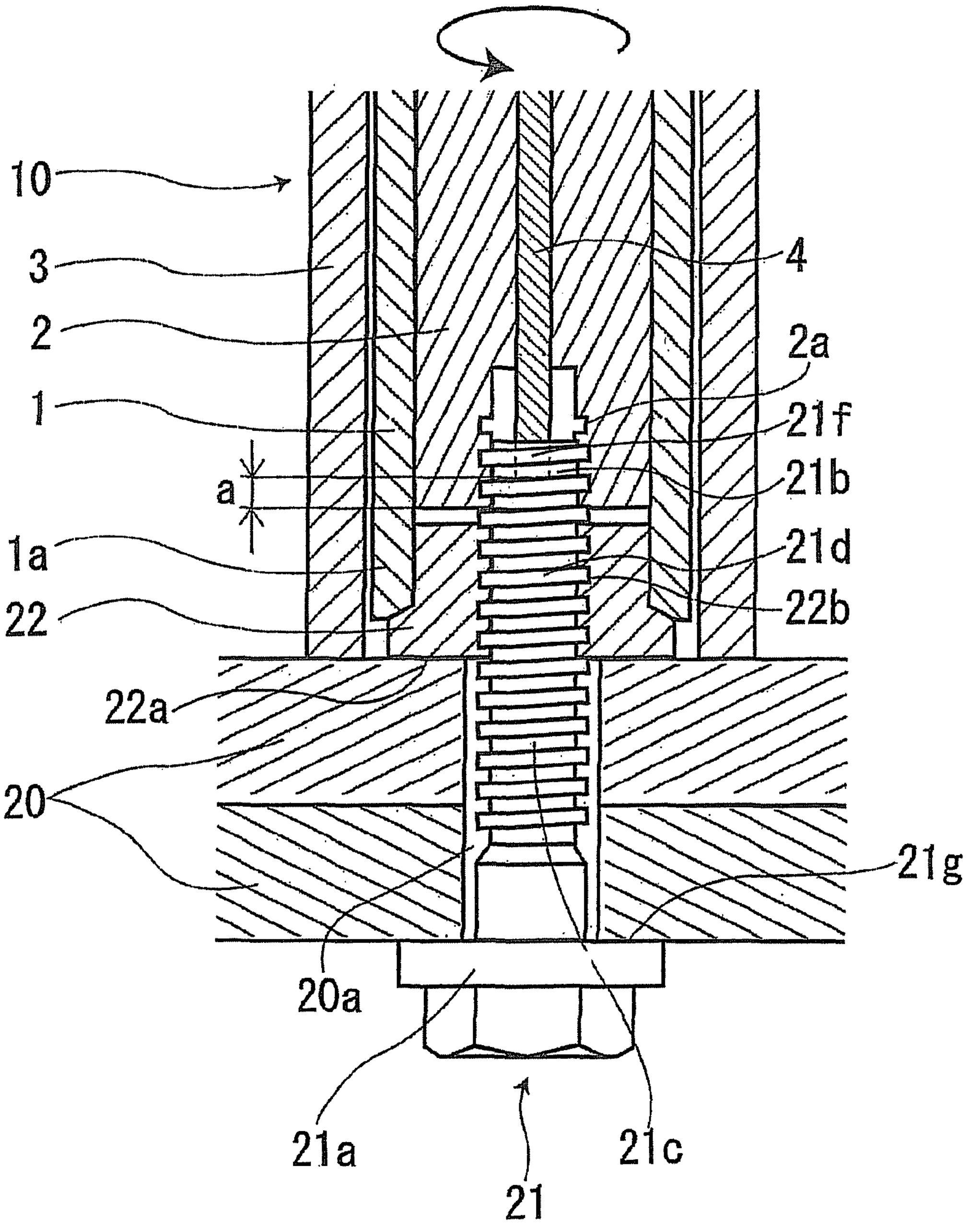
FIG. 4 is an explanatory view showing the first embodiment.

A threaded hole 2*a* engaging with a thread ridge of the bolt 21 is formed in a leading end of the spindle member 2. The leading end 21*b* of the shaft portion 21*c* of the bolt 21 is gripped by rotating the spindle member 2 so as to screw the threaded hole 2*a* of the spindle member 2 into the leading end 21*b* of the shaft portion 21*c* of the bolt 21 (a state in FIG. 4). At this time, in order to prevent the leading end of the spindle member 2 from being brought into contact with an upper end of the nut 22, the structure is made such that the rotation of the spindle member 2 is stopped if the leading end of the spindle member 2 is screwed into a predetermined position a from a leading end position of the inner member 4. In other words, the inner member 4 doubles as a role of a sensor stopping a spindle motor (not shown) rotating the spindle member 2. In this case, the predetermined position "a" from the leading end position of the inner member 4 can be optionally set by the used bolt.

Figure 5:
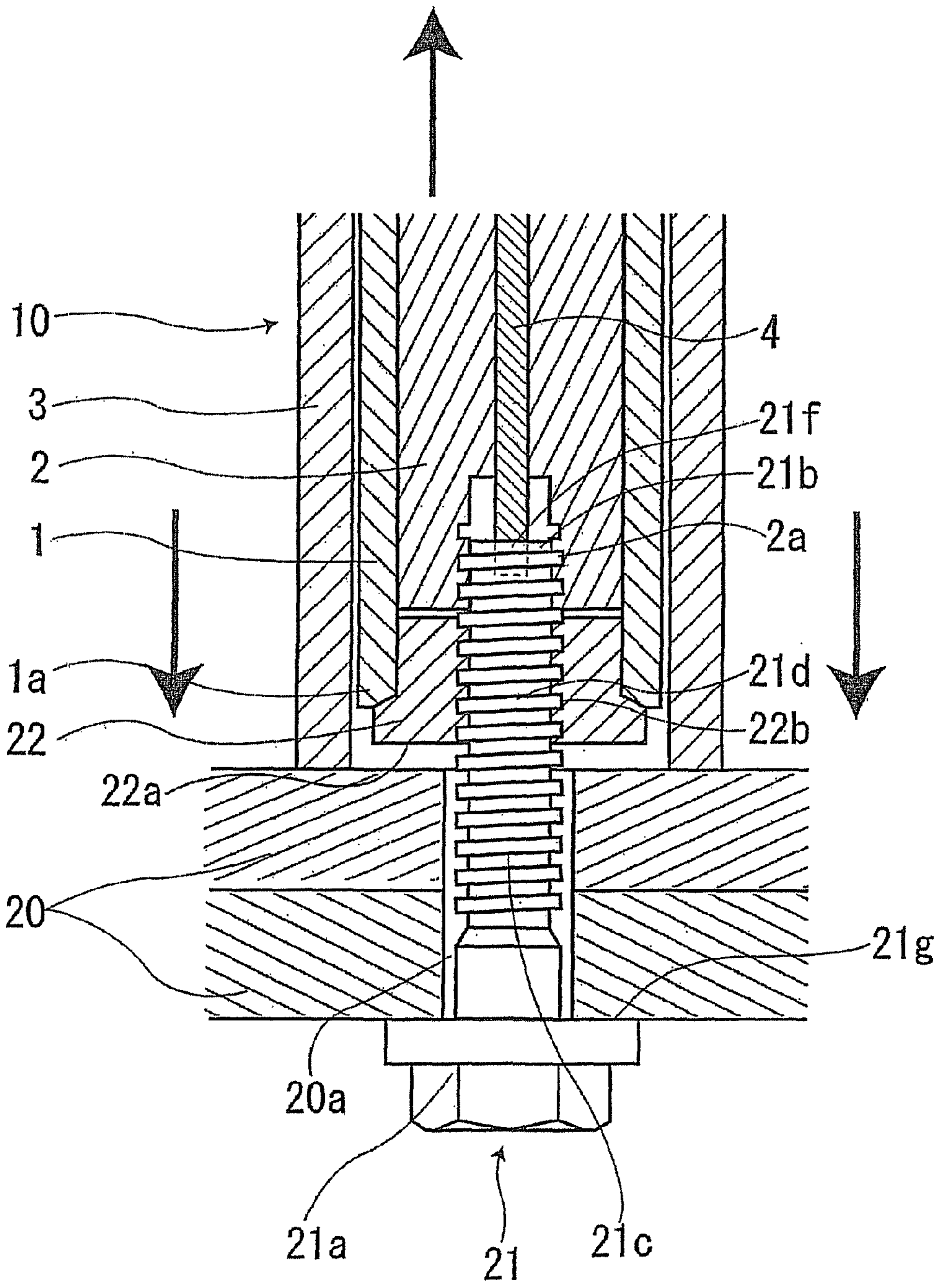
FIG. 5 is an explanatory view showing the first embodiment.

If the spindle member 2 pulls up the leading end 21*b* of the shaft portion 21*c* of the bolt 21, the pressing member 3 presses the fastened member 20 on the basis of a reaction force of an inner portion of the fastening tool 10. The fastened member 20 and the shaft portion 21*c* of the bolt 21 are respectively deformed elastically in opposite directions, and a gap is generated between the seat surface 22*a* of the nut 22 and the fastened member 20 opposing to the seat surface 22*a* (a state in FIG. 5). If the fastening tool 10 is provided with a load cell (not shown) measuring an axial force of the bolt 21, it is possible to securely apply a desired axial force to the bolt 21 while monitoring the desired axial force by the load cell.

Figure 6:
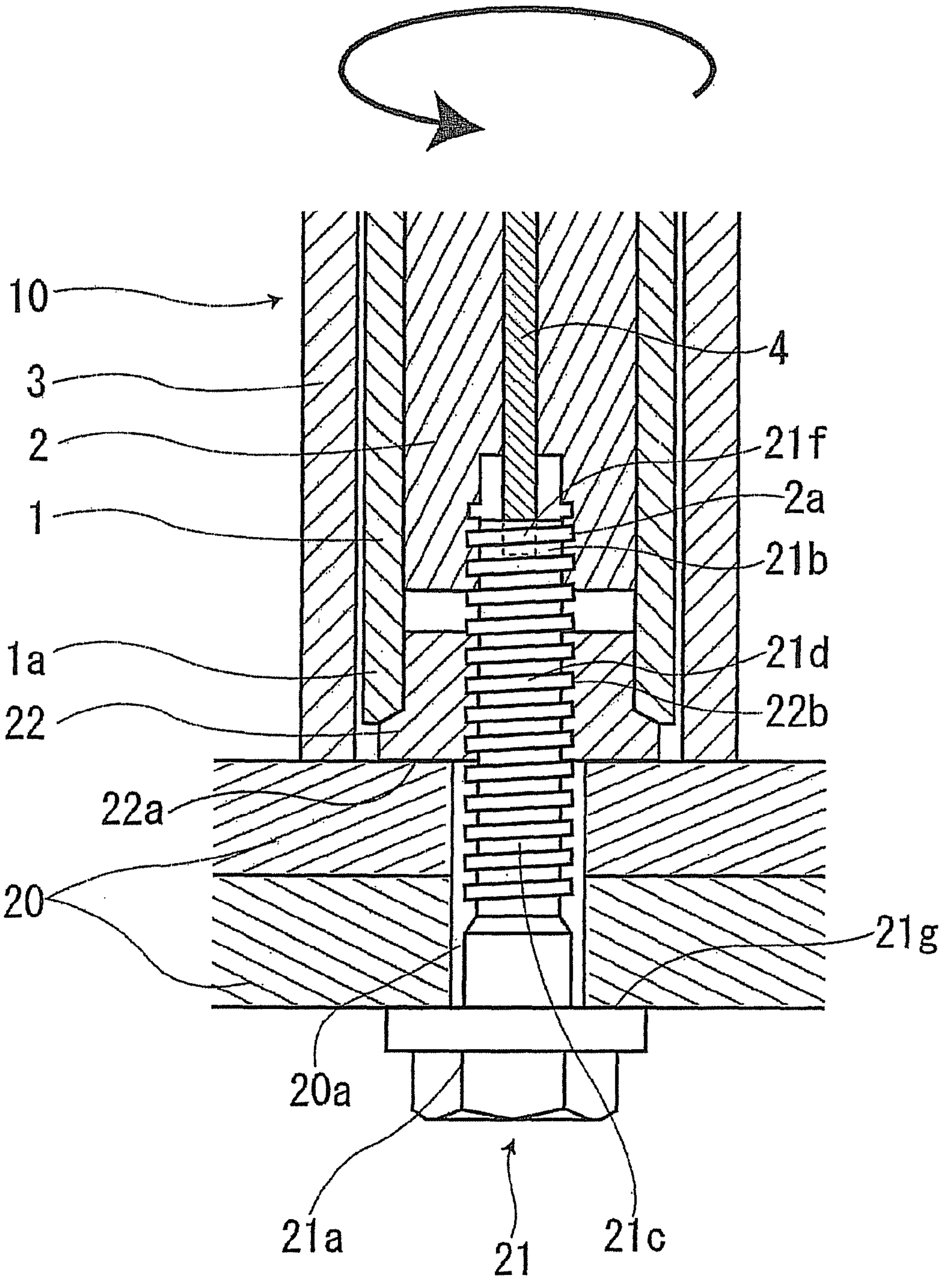
FIG. 6 is an explanatory view showing the first embodiment.

In this state, the nut 22 is screwed into the bolt 21 by rotating the fastening member 1 so as to rotate the nut 22 until the seat surface 22*a* of the nut 22 seats on the fastened member 20 (a state in FIG. 6). In this case, at a time of screwing the nut 22 into the bolt 21, the seat surface 21*g* of the bolt 21 is pressed to the fastened member 20 on the basis of the axial force stored in the shaft portion 21*c* of the bolt 21 and a friction force is generated, whereby the bolt 21 rotates but does not rotate together with the nut 22. Further, if the structure is made such as to fix the inner member 4 at a time of screwing the nut 22 into the bolt 21, it is possible to more securely prevent the co-rotation.

Figure 7:
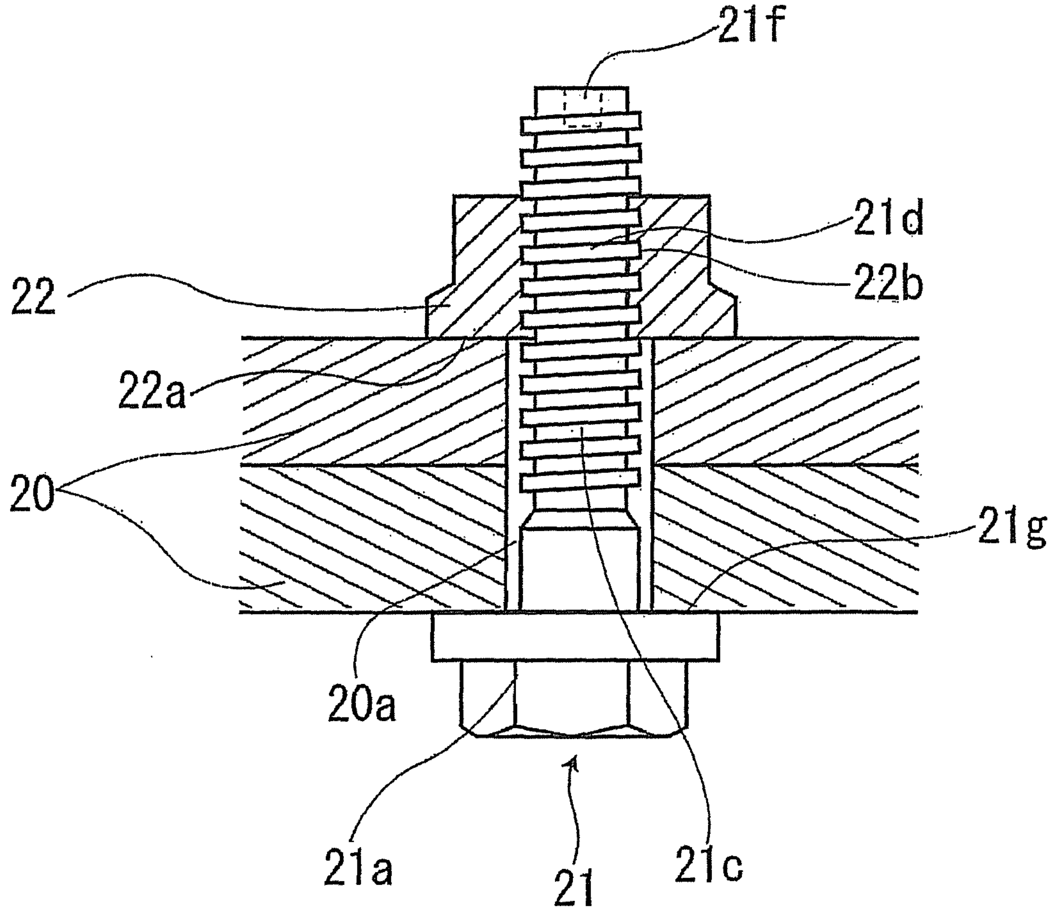
FIG. 7 is an explanatory view showing the first embodiment.

If the pressing member 3 is thereafter got off from the fastened member 20, the spindle member 2 is rotated in an opposite side to a fastening direction, and the spindle member 2 is got off from the leading end 21*b* of the bolt 21, the fastening of the fastened member 20 is finished (a state in FIG. 7).

A friction force is generated in a threaded portion 21*d* of the bolt 21 and a threaded portion 22*b* of the nut 22 on the basis of the axial force (an elastic energy and a strain energy) stored in an inner portion of the shaft portion 21*c* of the bolt 21, whereby the bolt 21 and the nut 22 are hard to be loosened. Further, since a load pressing down in an axial direction is applied to the nut 22 on the basis of the axial force stored in the inner portion of the shaft portion 21*c* of the bolt 21, the friction force is generated between the seat surface 22*a* of the nut 22 and the fastened member 20, and the nut 22 is hard to be loosened.

As mentioned above, in the fastening method in accordance with the present invention, the structure is made such as to rotate the nut 22 until seating on the fastened member 20, in the state in which the leading end 21*b* of the bolt 21 is pulled in the axial direction of the bolt 21, the axial force is generated by elastically deforming the bolt 21 and the gap is generated between the fastened member 20 and the nut 22. Accordingly, since it is possible to extremely reduce the friction force between the threaded portion 21*d* of the bolt 21 and the threaded portion 22*b* of the nut 22 at a time of fastening the nut 22 to the bolt 21, and the friction force is not generated between the seat surface 22*a* of the nut 22 and the fastened member 20, it is possible to rotate and fasten the nut 22 while applying a sufficient axial force to the bolt 21.

In the fastening method in accordance with the present invention, the friction force between the threaded portion 21*d* of the bolt 21 and the threaded portion 22*b* of the nut 22 is small, and the friction force is not generated between the seat surface 22*a* of the nut 22 and the fastened member 20 opposing to the seat surface 22*a*. Accordingly, it is possible to fasten the nut 22 by a low fastening torque. Therefore, it is possible to rotate and fasten the nut 22 without scratching a surface treatment layer for a rust proofing applied to a surface of the nut 22, and it is not necessary to apply a rust proofing treatment after fastening the nut 22.

Second Embodiment

Figure 8:
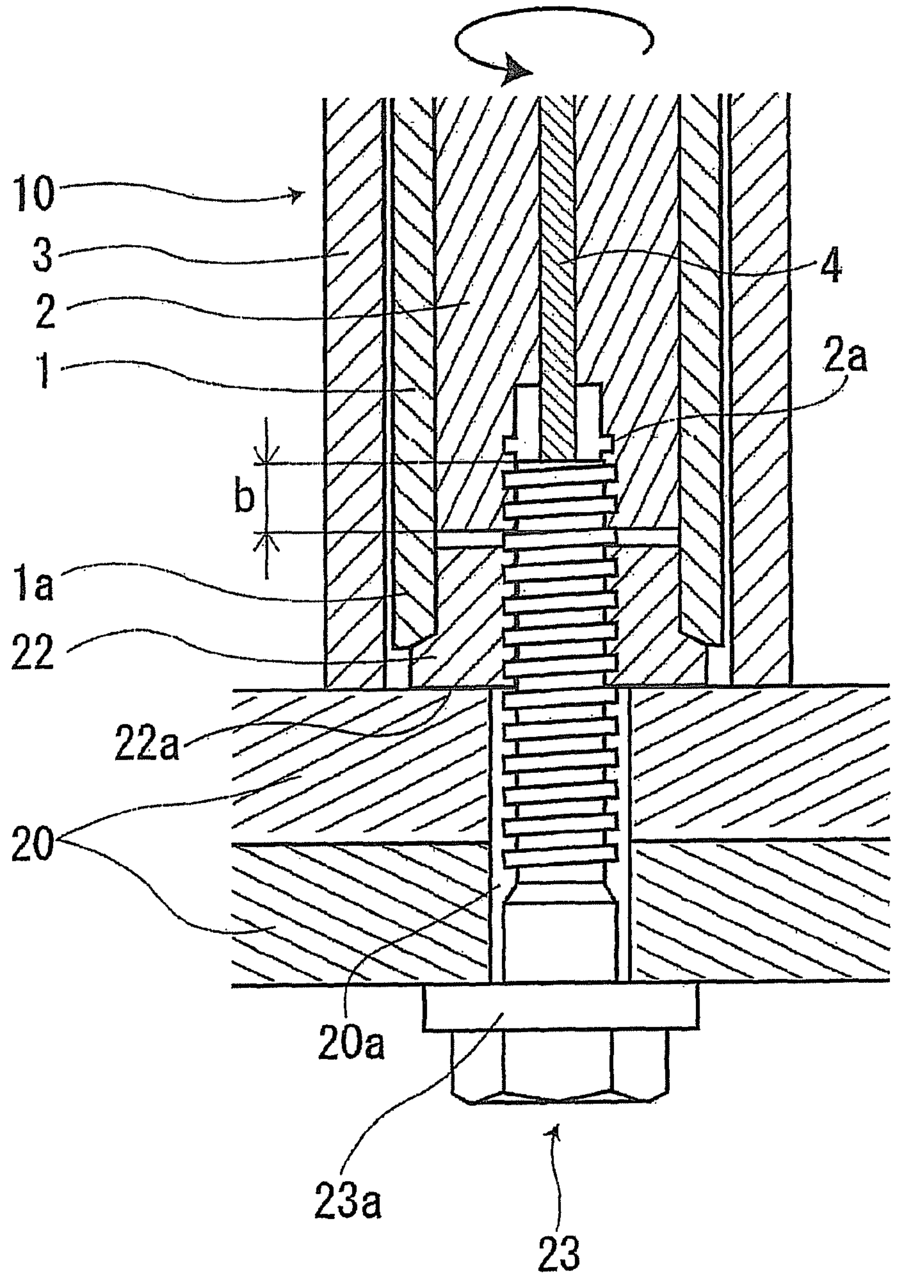
FIG. 8 is an explanatory view showing a second embodiment.

Next, FIG. 8 shows an explanatory view showing a second embodiment, and a description will be given of the second embodiment. In this second embodiment, a normal bolt 23 is used. In this case, the normal bolt 23 means a bolt in which the engagement concave portion 21*f* (the first embodiment) is not formed in the leading end of the shaft portion of the bolt.

The bolt 23 is passed through the hole 20*a* of the fastened member 20, the nut 22 is thereafter screwed into the bolt 23 so as to be temporarily fastened until the seat surface 22*a* of the nut 22 comes into contact with the fastened member 20, and the fastening tool 10 is set. The threaded hole 2*a* of the spindle member 2 is screwed into the leading end of the bolt 23 by rotating the spindle member 2, and the spindle member 2 grips the bolt 23. At this time, in order to prevent the leading end of the spindle member 2 from being brought into contact with the upper end of the nut 22, the structure is made such that if the leading end of the spindle member 2 is screwed to a predetermined position "b" from the leading end position of the inner member 4, the rotation of the spindle member 2 is stopped. In other words, the inner member 4 doubles as a role of a sensor stopping a spindle motor (not shown) rotating the spindle member 2. In this case, the predetermined position "b" from the leading end position of the inner member 4 can be optionally set by the used bolt 22 and bolt 23. The fastening method after gripping the leading end of the bolt 23 by the spindle member 2 is the same as the first embodiment.

Third Embodiment

Next, a description will be given of a third embodiment. A fastening tool used in this third embodiment basically has the same structure as the fastening tool 10 used in the first embodiment, however, is structured such that the inner portion of the spindle member 2 is provided with a fixing member 5 in which a leading end thereof is engaged with the engagement concave portion 21*f* provided in the leading end 21*b* of the bolt 21 so as to be slid in an axial direction, in place of the inner member 4. In this case, the fixing member 5 is not rotated as is different from the inner member 4 in accordance with the first embodiment.

Figure 9:
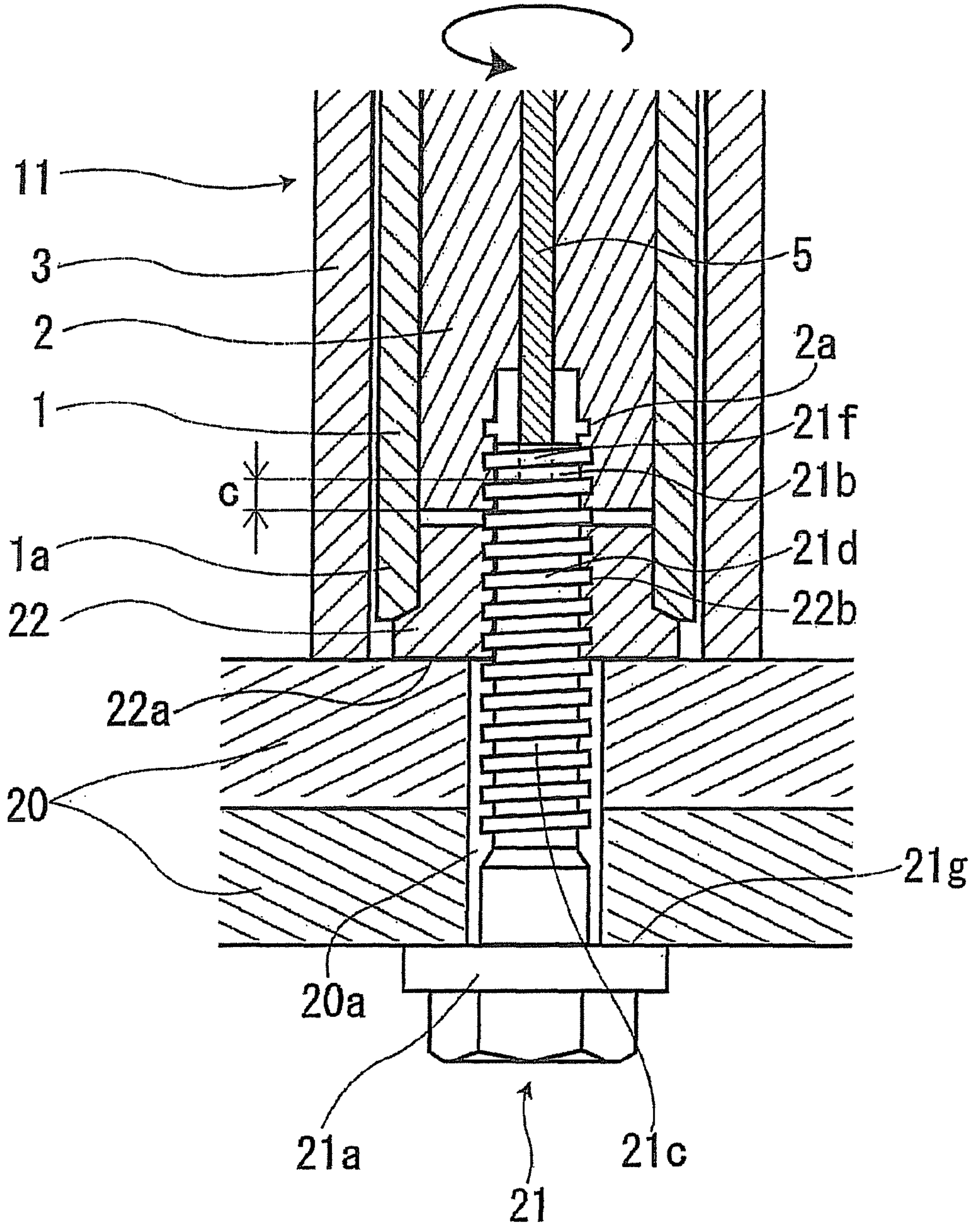
FIG. 9 is an explanatory view showing a third embodiment.

In this third embodiment, the bolt 21 is passed through the hole 20*a* of the fastened member 20, the nut 22 is thereafter screwed into the bolt 21 so as to be temporarily fastened until the seat surface 22*a* of the nut 22 comes into contact with the fastened member 20, and the fastening tool 11 is set. At this time, the leading end of the fixing member 5 is inserted to the engagement concave portion 21*f* of the bolt 21, and the leading end of the bolt 23 is gripped by rotating the spindle member 2 from the leading end of the fixing member 5 to a predetermined position "c", and screwing the threaded hole 2*a* of the spindle member 2 to the leading end of the bolt 23 (a state in FIG. 9). The fixing member 5 also doubles as a role of the sensor stopping the spindle motor (not shown) rotating the spindle member 2. In this case, the predetermined position "c" from the leading end position of the fixing member 5 can be optionally set by the used bolt.

A gap is generated between the seat surface 22*a* of the nut 22 and the fastened member 20 opposing to the seat surface 22*a* by pulling up the leading end 21*b* of the shaft portion 21*c* of the bolt 21 by the spindle member 2. In this state, the nut 22 is screwed into the bolt 21 by rotating the fastening member 1 so as to rotate the nut 22 until the seat surface 22*a* of the nut 22 seats on the fastened member 20. In this third embodiment, since the fixing member 5 is engaged with the engagement concave portion 21*f* of the bolt 21 at a time of screwing the nut 22 into the bolt 21 by the fastening member 1, thereby preventing the bolt 21 from being rotated, it is possible to prevent the co-rotation of the bolt 21 and the nut 22. As mentioned above, in accordance with the third embodiment, even in the case that the head portion 21*a* of the bolt 21 can not be gripped by a spanner or the like, such as a case that the head portion 21*a* of the bolt 21 is formed as a spherical crown shape, a case that a space for inserting the tool such as the spanner or the like is not provided around the head portion 21*a* of the bolt 21 and the like, it is possible to prevent the co-rotation of the bolt 21 and the nut 22.

Fourth Embodiment

Figure 10:
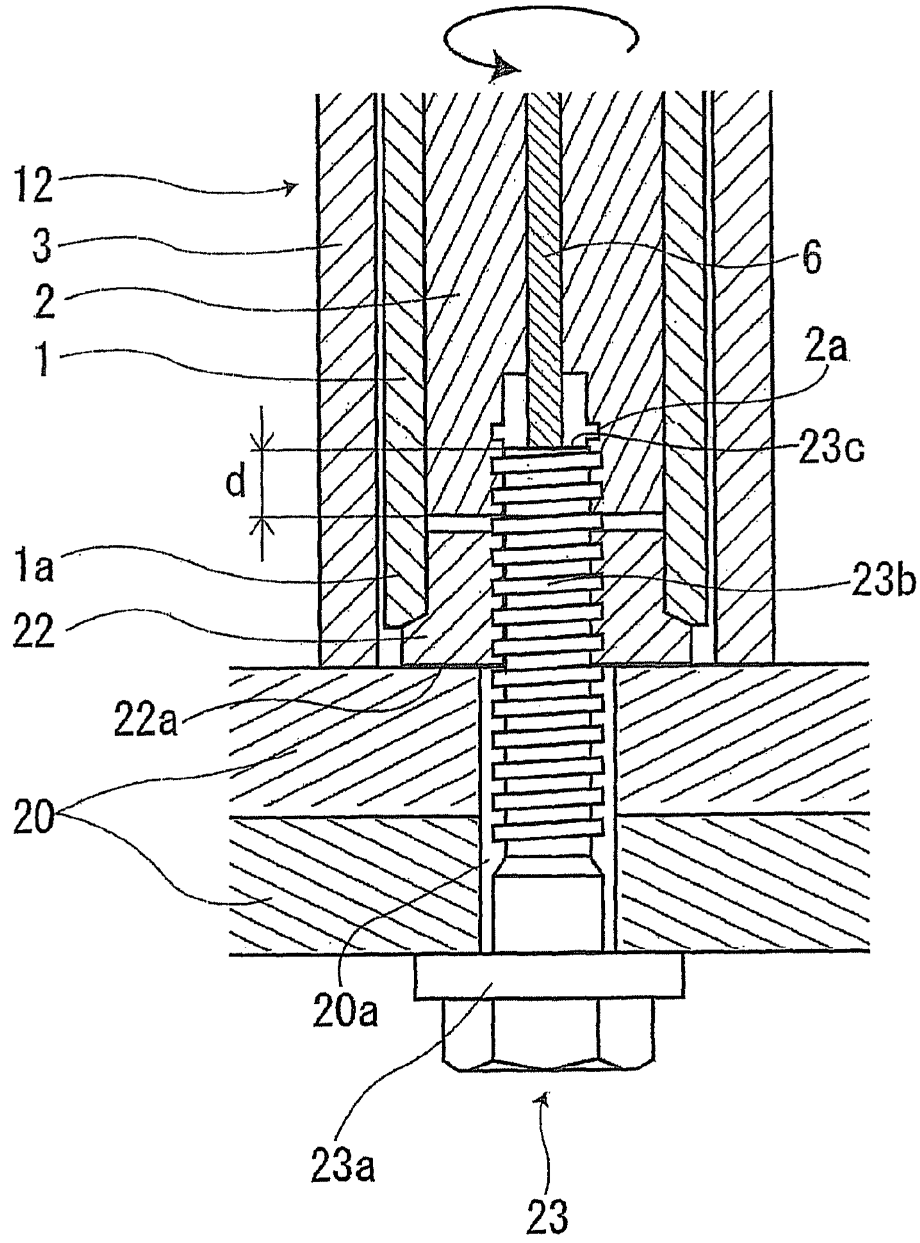
FIG. 10 is an explanatory view showing a fourth embodiment.

FIG. 10 shows an explanatory view of a fourth embodiment, and a description will be given of the fourth embodiment. In this fourth embodiment, the normal bolt 23 is used. In this case, the normal bolt 23 means a bolt in which the engagement concave portion 21*f* (the first embodiment and the third embodiment) is not formed in the leading end of the shaft portion of the bolt.

A fastening tool 12 used in the fourth embodiment basically has the same structure as the fastening tool 10 used in the first embodiment, however, is structured such that the inner portion of the spindle member 2 is provided with a fixing member 6 sliding in an axial direction, in place of the inner member 4. In this case, the fixing member 6 does not rotate as is different from the inner member 4 in accordance with the first embodiment. The fourth embodiment corresponds to an embodiment which prevents a co-rotation of the bolt 23 by pressing a leading end 23*c* of a shaft portion 23*b* of the bolt 23 by the leading end of the fixing member 6, at a time of screwing the threaded hole 2*a* of the spindle member 2 into the leading end 23*c* of the bolt 23.

In the fourth embodiment, the bolt 23 is passed through the hole 20*a* of the fastened member 20, the nut 22 is thereafter screwed into the bolt 23 so as to be temporarily fastened until the seat surface 22*a* of the nut 22 comes into contact with the fastened member 20, and the fastening tool 11 is set. Next, the fixing member 6 is slid to the leading end 23*c* side of the bolt 23, and the leading end 23*b* of the shaft portion 23*b* of the bolt 23 is pressed by the leading end of the fixing member 6. The leading end of the bolt 23 is gripped by rotating the spindle member 2 to a predetermined position "d" from the leading end of the fixing member 6, and screwing the threaded hole 2*a* of the spindle member 2 to the leading end 23*c* of the bolt 23 (a state in FIG. 10). At this time, since the leading end 23*c* of the bolt 23 is pressed by the leading end of the fixing member 6, the friction force is generated between the thread ridges of the bolt 23 and the nut 22, and between the seat surface 22*a* of the nut 22 and the fastened member 20, and it is possible to securely screw the threaded hole 2*a* of the spindle member 2 into the leading end 23*c* of the bolt 23 without the bolt 23 idle rotating.

The fixing member 6 also doubles as the sensor stopping the spindle motor (not shown) rotating the spindle member 2.

In this case, the predetermined position "d" from the leading end position of the fixing member 6 can be optionally set by the used bolt.

A gap is generated between the seat surface 22*a* of the nut 22 and the fastened member 20 opposing to the seat surface 22*a*, by pulling up the leading end 23*c* of the shaft portion 23*b* of the bolt 23 by the spindle member 2. In this state, the fastening member 1 is rotated, the nut 22 is rotated until the seat surface 22*a* of the nut 22 seats on the fastened member 20, and the nut 22 is screwed into the bolt 23, whereby the fastening work is finished.

Fifth Embodiment

Figure 11:
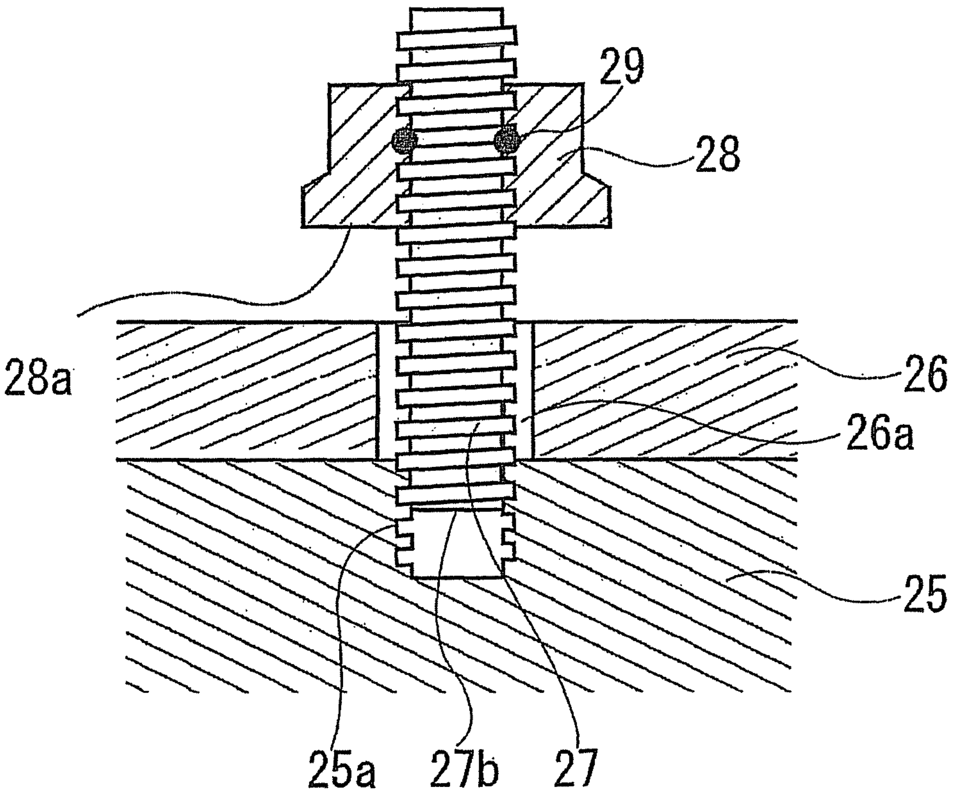
FIG. 11 is an explanatory view showing a fifth embodiment.

Next, a description will be given of a fifth embodiment. The fifth embodiment corresponds to a method of fastening a first fastened member 25 in which a threaded hole 25*a* is formed, and a second fastened member 26 in which a clearance hole 26*a* is formed, by a stud bolt 27 and a nut 28, as shown in FIG. 11.

In this embodiment, the structure is made such that a torque transmitting means 29 is formed by deforming a threaded portion of one of the stud bolt 27 and the nut 28, and the nut 28 is screwed into the stud bolt 27 so as to be integrated, whereby the stud bolt 27 and the nut 28 do not rotate with each other at a predetermined low fastening torque or less. In this case, the torque transmitting means 29 may be structured by applying an adhesive material such as a Nylok (trade mark) or the like to the threaded portion of one of the stud bolt 27 and the nut 28.

Figure 12:
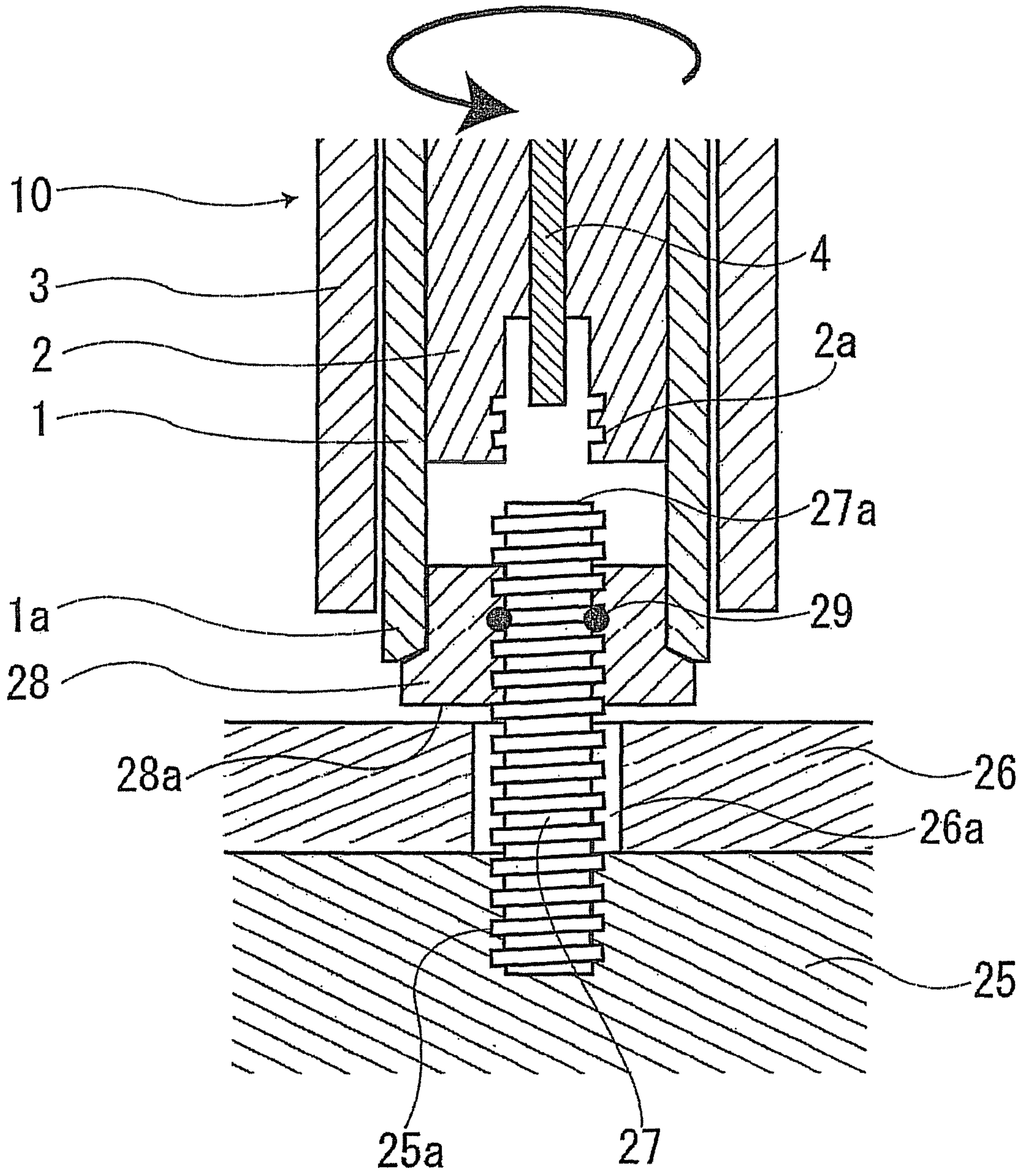
FIG. 12 is an explanatory view showing the fifth embodiment.

The second fastened member 26 is arranged on the first fastened member 25 in such a manner that the clearance hole 26*a* is arranged coaxially with the threaded hole 25*a*, and the stud bolt 27 and the nut 28 integrated by the torque transmitting means 29 are temporarily fastened to the threaded hole 25*a* of the second fastened member 25 (a state in FIG. 12). At this time, since the stud bolt 27 and the nut 28 are not rotated at the predetermined low fastening torque by the torque transmitting means 29, it is possible to rotate the nut 28 so as to screw the stud bolt 27 into the threaded hole 25*a*.

Figure 13:
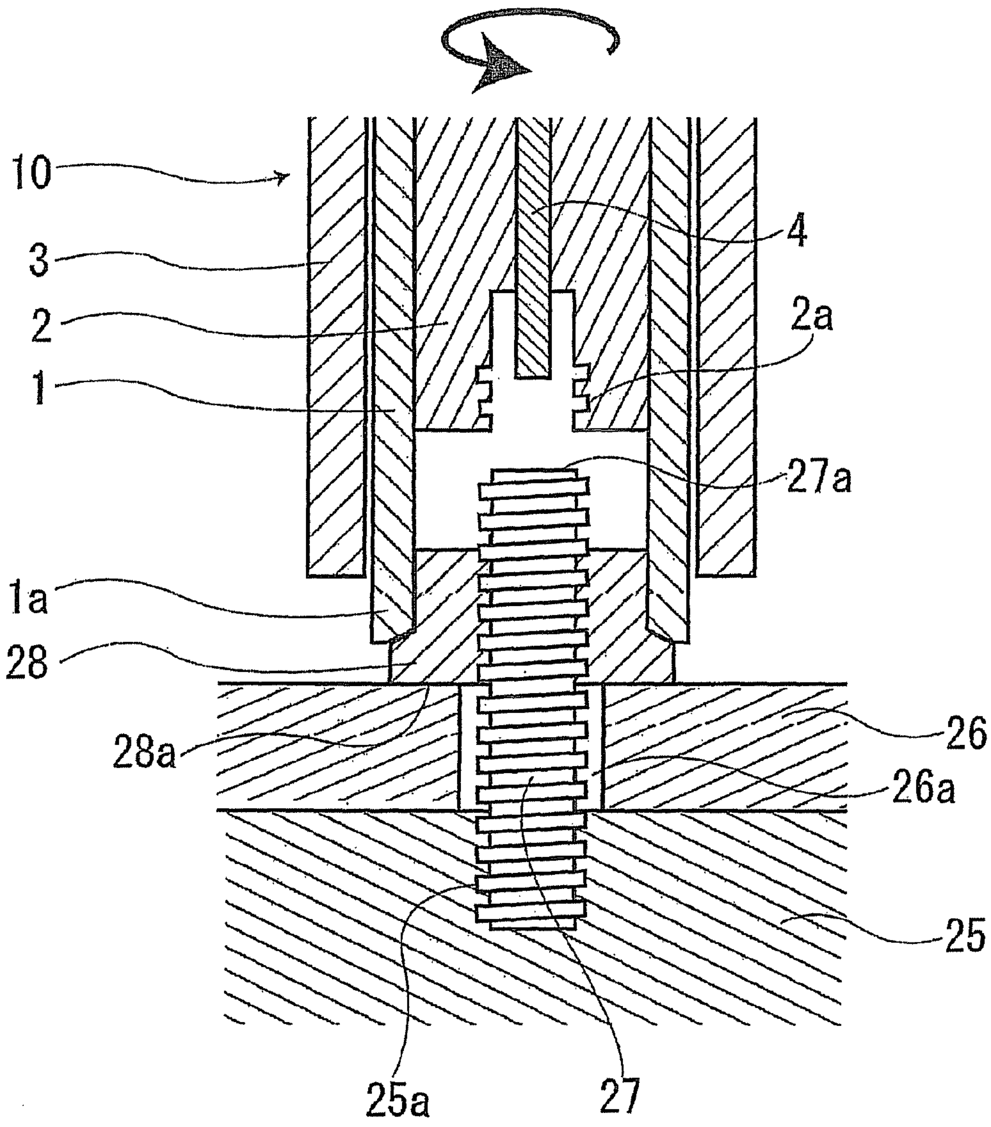
FIG. 13 is an explanatory view showing the fifth embodiment.

The leading end 1*a* of the fastening member 1 is engaged with the nut 28 so as to set the fastening tool 10, the fastening member 1 is rotated, and the stud bolt 27 is screwed until the seat surface 28*a* of the nut 28 is brought into contact with the second fastened member 26 (a state in FIG. 13). In this case, if the seat surface 28*a* of the nut 28 is brought into contact with the second fastened member 26, the fastening torque of the fastening member 1 is increased, and the rotation of the fastening member 1 is stopped. In this case, since the stud bolt 27 and the nut 28 are not rotated at the predetermined low fastening torque by the torque transmitting means 29 as mentioned above, until the leading end of the stud bolt 27 is brought into contact with a bottom portion of the threaded hole 25*a* of the first fastened member 25 (the state in FIG. 12), it is possible to rotate the nut 28 so as to screw the stud bolt 27 into the threaded hole 25*a*. On the other hand, if the leading end of the stud bolt 27 is brought into contact with the bottom portion of the threaded hole 25*a* of the first fastened member 25 (the state in FIG. 12), the torque transmitting means 29 is broken at the predetermined torque or more. Therefore, the nut 28 is rotated.

Figure 14:
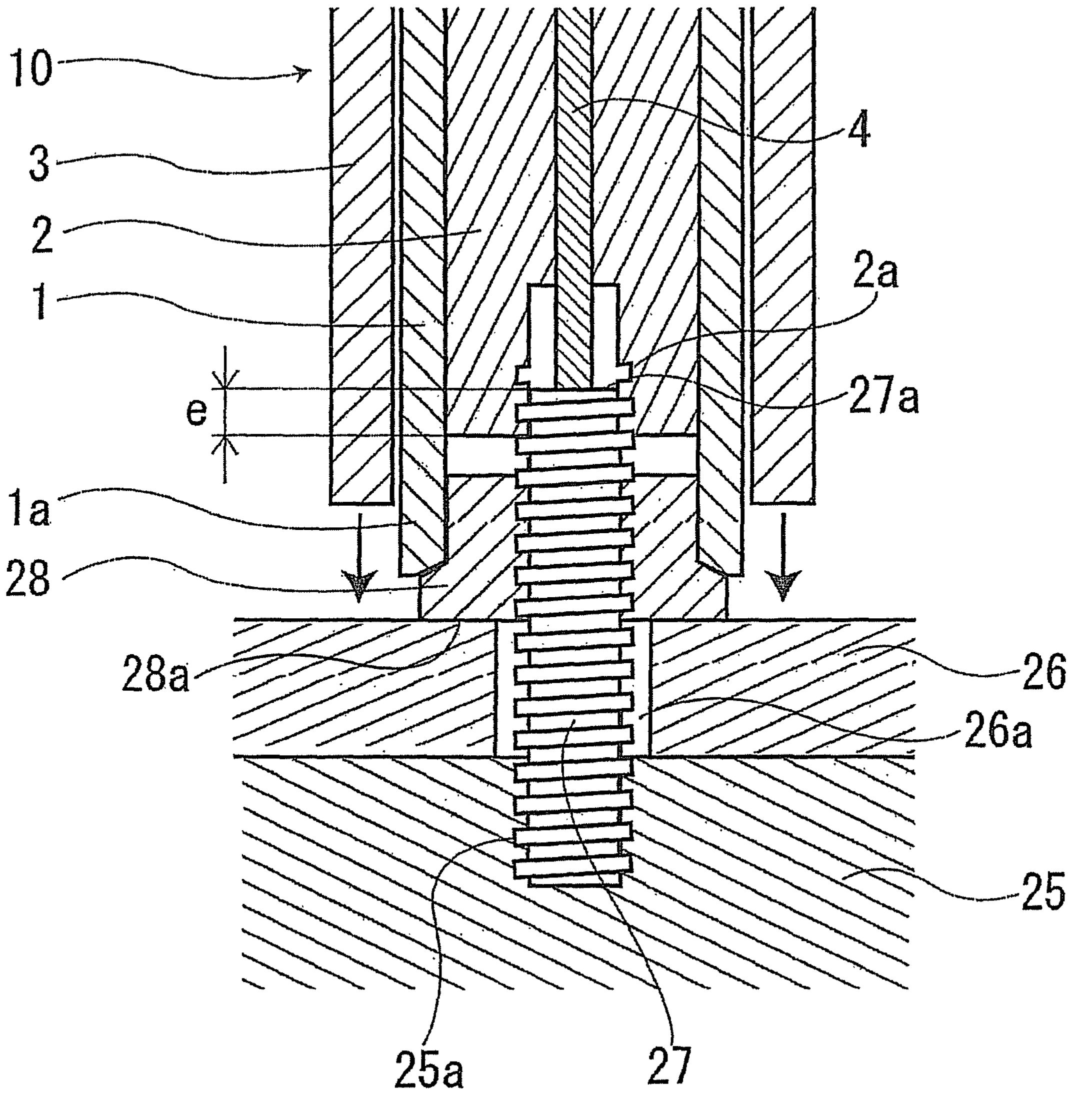
FIG. 14 is an explanatory view showing the fifth embodiment.

If the seat surface 28*a* of the nut 28 is brought into contact with the second fastened member 26, and the rotation of the nut 28 is stopped (the state in FIG. 13), the spindle member 2 automatically starts rotating while moving down, the threaded hole 2*a* of the spindle member 2 is screwed into the leading end 27*a* of the stud bolt 27, and the spindle member 2 grips the leading end 27*a* of the stud bolt 27 (a state in FIG. 14). At this time, in order to prevent the leading end of the spindle member 2 from being brought into contact with the upper end of the nut 28, the structure is made such that if the leading end of the inner member 4 is brought into contact with the leading end 27*a* of the stud bolt 27, and the leading end of the spindle member 2 is screwed to a predetermined position "e" from the leading end position of the inner member 4, the rotation of the spindle member 2 is stopped. In other words, the inner member 4 doubles as the role of the sensor stopping the spindle motor (not shown) rotating the spindle member 2. In this case, the predetermined position "e" form the leading end position of the inner member 4 can be optionally set by the used bolt 28 or the stud bolt 27.

Figure 15:
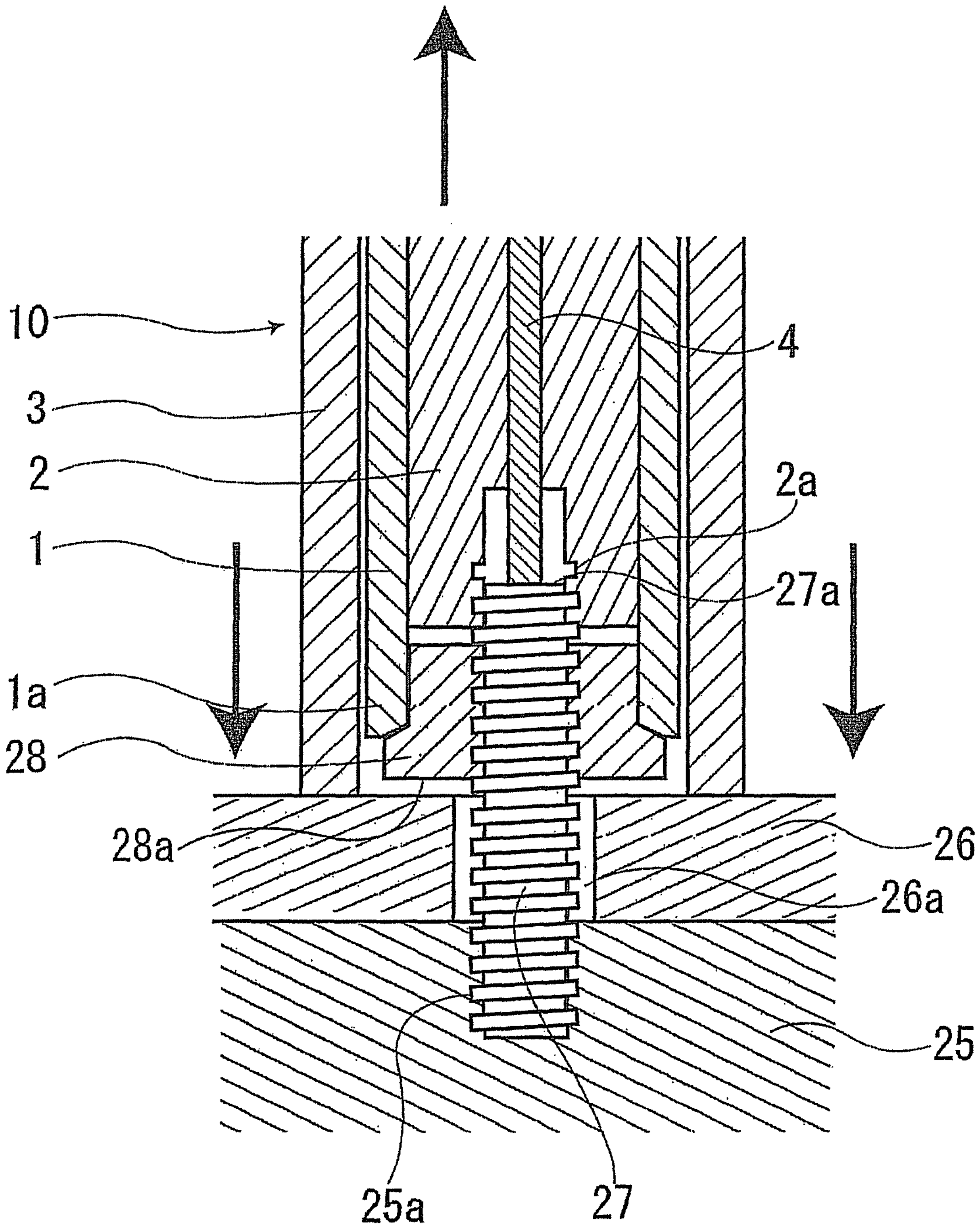
FIG. 15 is an explanatory view showing the fifth embodiment.

If the leading end 27*a* of the stud bolt 27 is pulled up by the spindle member 2, the pressing member 3 presses the second fastened member 26 on the basis of a reaction force in the inner portion of the fastening tool 10, whereby the second fastened member 26 and the stud bolt 27 are elastically deformed respectively in opposite directions (a state in FIG. 15). In this state, a gap is generated between the seat surface 28*a* of the nut 28, and the second fastened member 26 opposing to the seat surface 28*a*.

Figure 16:
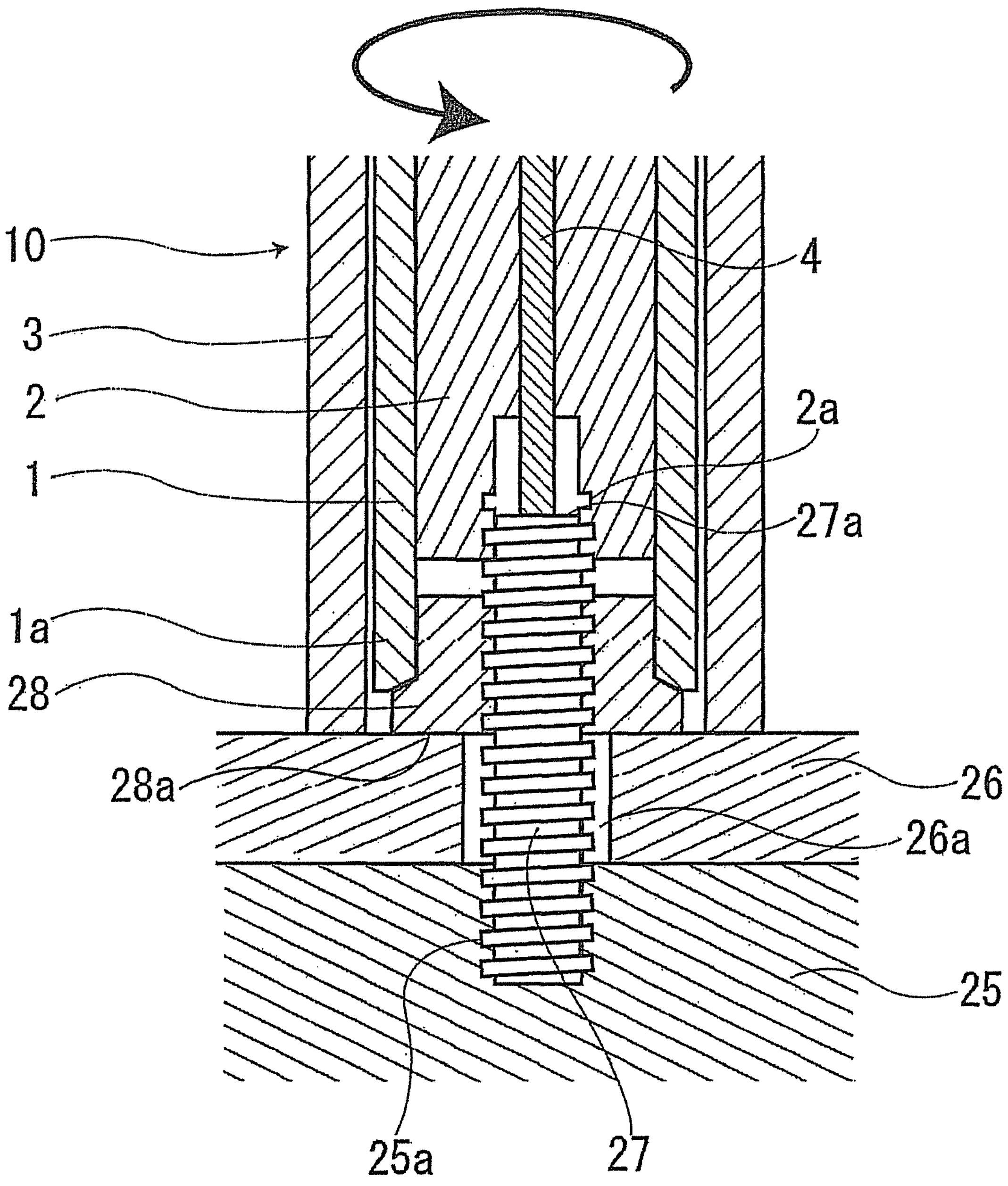
FIG. 16 is an explanatory view showing the fifth embodiment.

If the fastening member 1 is rotated in this state, the stud bolt 27 is not rotated, but the nut 28 is rotated, because the friction force is generated between the threaded hole 25*a* and the threaded portion of the stud bolt 27 on the basis of the axial force. The nut 28 is rotated until the seat surface 28*a* of the nut 28 seats on the second fastened member 25, and the nut 28 is screwed into the stud bolt 27 (a state in FIG. 16).

Figure 17:
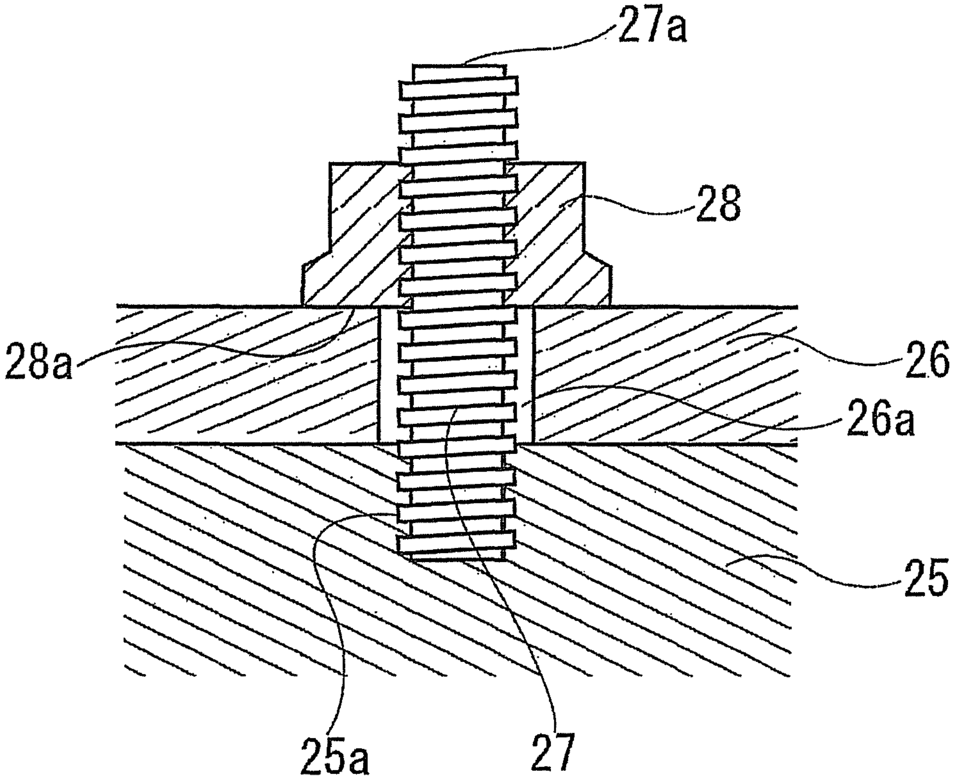
FIG. 17 is an explanatory view showing the fifth embodiment.
Figure 18:
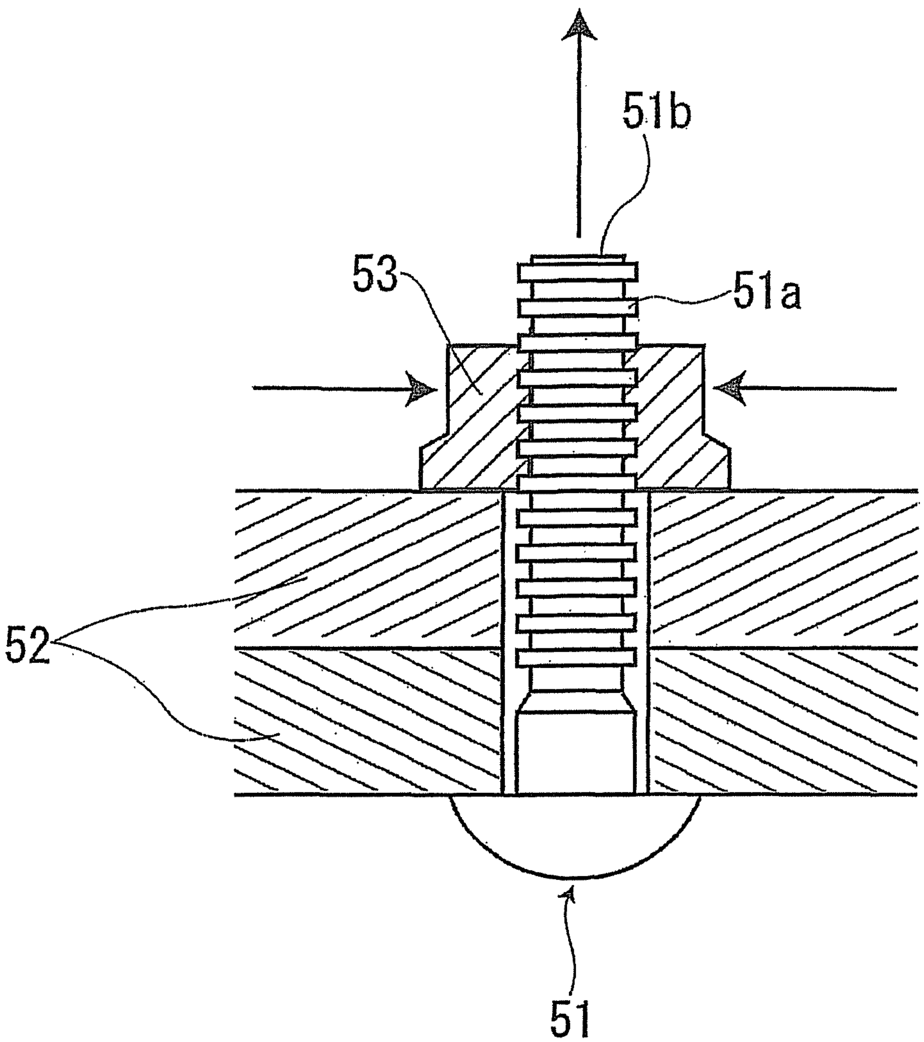
FIG. 18 is an explanatory view showing a conventional swage fastening method (non-disassembly)
Figure 19:
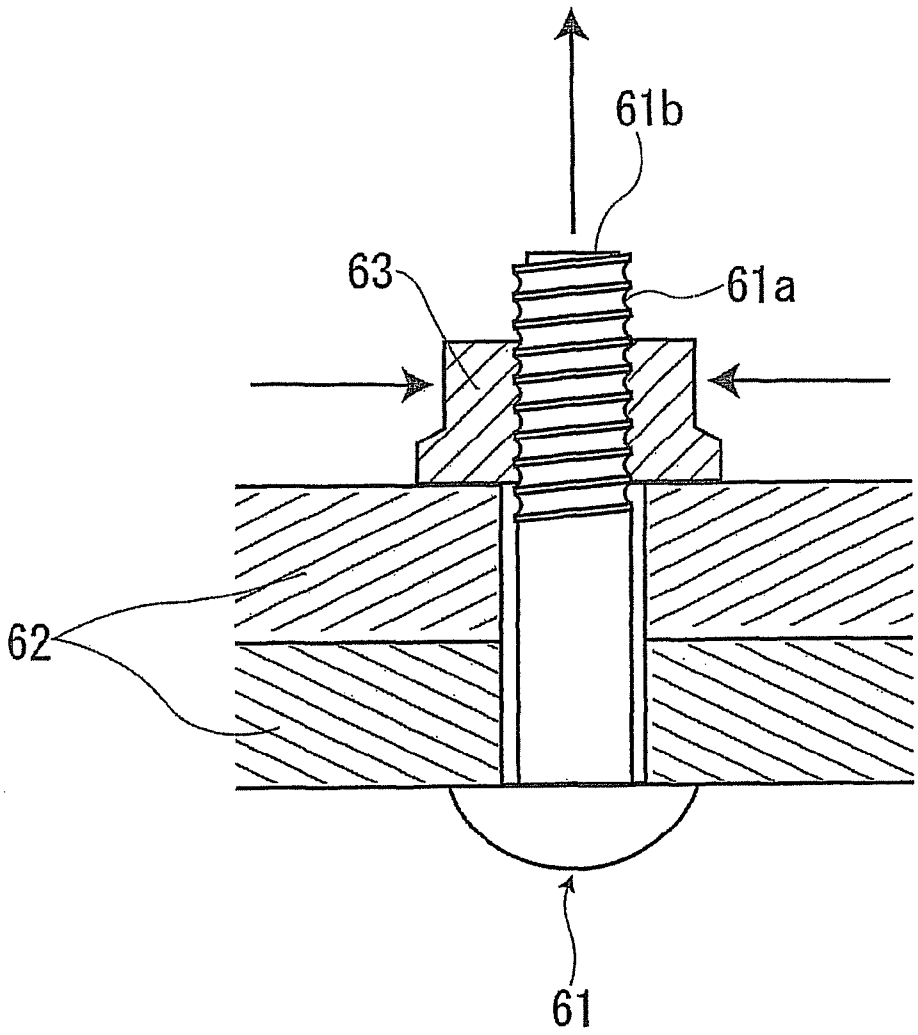
FIG. 19 is an explanatory view showing the conventional swage fastening method (disassembly).

Thereafter, if the spindle member 2 is rotated in the opposite direction to the fastening direction after removing the pulling force of the spindle member 2, and the spindle member 2 is detached form the leading end 27*a* of the stud bolt 27 by detaching the pressing member 3 form the second fastened member 26, the fastening between the first fastened member 25 and the second fastened member 26 is finished (a state in FIG. 17).

The friction force is generated between the stud bolt 27 and the threaded hole 25*a* of the fastened member 25, and between the stud bolt 27 and the threaded portion of the nut 28, on the basis of the axial force (the elastic energy and the strain energy) stored in the stud bolt 27, whereby the stud bolt 27 and the nut 28 are hard to be loosened. Further, since the pushing down load is applied to the nut 28 in the axial direction on the basis of the axial force stored in the stud bolt 27, the friction force is generated in the seat surface 28*a* of the nut 28 and the second fastened member 25, and the nut 28 is hard to be loosened.

The present invention is described above in connection with the embodiments which seem to be most practical and preferable at this time. However, the present invention is not limited to the embodiments disclosed in the specification of the present invention, but can be appropriately modified within the range which does not go counter to the contents or concept of the invention readable from the claims and the whole specification. The fastening method and the fastening tool having such the modification should be understood to be included within the technical range.

DESCRIPTION OF REFERENCE NUMERALS

1 fastening member
1*a* leading end portion
2 spindle member
2*a* threaded hole
3 pressing member
4 inner member
5 fixing member (third embodiment)

6 fixing member (fourth embodiment)
10 fastening tool (first embodiment, second embodiment and fifth embodiment
11 fastening tool(third embodiment)
12 fastening tool(fourth embodiment)
20 fastened member
20*a* hole
21 bolt (first embodiment)
21*a* head portion
21*b* leading end
21*c* shaft portion
21*d* threaded portion
21*e* head portion (second embodiment)
21*f* engagement concave portion
21*g* seat surface
22 nut
22*a* seat surface
22*b* threaded portion
23 bolt (second embodiment and fourth embodiment)
23*a* head portion
23*b* shaft portion
23*c* leading end
24 bolt (third embodiment)
25 first fastened member
25*a* threaded hole
26 second fastened member
26*a* clearance hole
27 stud bolt
27*a* leading end
27*b* leading end
28 nut
28*a* seat surface
29 torque transmitting means
51 pin
51*a* parallel groove
52 fastened member
53 pin
61 Hacks pin (trade mark)
61*a* parallel groove
61*b* leading end of pin
62 fastened member
63 collar
61 pin
61*a* parallel groove
61*b* leading end of pin
62 fastened member
63 collar
a predetermined position from leading end position of inner member (first embodiment)
b predetermined position from leading end position of inner member (second embodiment)
c predetermined position from leading end position of inner member (third embodiment)
d predetermined position from leading end position of inner member (fourth embodiment)
e predetermined position from leading end position of inner member (fifth embodiment)

What is claimed:

1. A fastening tool comprising:
a tubular tool fastening member configured to rotate a nut;
a spindle member stored in an inner portion of the tool fastening member and configured to pull a shaft portion of a bolt or a leading end of a stud bolt in an axial direction,
an inner member provided within the spindle member, the inner member being configured to rotate the bolt such that a leading end of the inner member is engaged with an engagement portion provided within the shaft portion of the bolt, wherein the inner member independently slides in an axial direction and separately rotates the bolt with respect to the spindle member; and
a pressing member configured to press a fastened member on the basis of a reaction force applied to the spindle member and provided outwardly of the tool fastening member.

2. The fastening tool as claimed in claim 1, wherein the rotation of the inner member is stopped and the spindle member is rotated until the leading end of the spindle member is screwed into a predetermined position from the leading end of the inner member.

* * * * *